(12) United States Patent
Anderson et al.

(10) Patent No.: US 10,095,056 B1
(45) Date of Patent: Oct. 9, 2018

(54) THERMO-OPTIC PHASE SHIFTER FOR SEMICONDUCTOR OPTICAL WAVEGUIDE

(71) Applicant: Cisco Technology, Inc., San Jose, CA (US)

(72) Inventors: Sean P. Anderson, Macungie, PA (US); Donald Adams, Rochester, NY (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/498,274

(22) Filed: Apr. 26, 2017

(51) Int. Cl.
*G02F 1/01* (2006.01)

(52) U.S. Cl.
CPC ...... *G02F 1/0147* (2013.01); *G02F 2201/066* (2013.01); *G02F 2201/12* (2013.01)

(58) Field of Classification Search
CPC .................................................... G02F 1/0147
See application file for complete search history.

(56) References Cited

U.S. PATENT DOCUMENTS

| | | | |
|---|---|---|---|
| 7,630,596 B2 * | 12/2009 | Watanabe | B81B 3/0081 216/2 |
| 7,983,517 B1 | 7/2011 | Watts et al. | |
| 8,027,554 B2 | 9/2011 | Takahashi | |
| 8,150,218 B2 * | 4/2012 | Takahashi | G02F 1/011 385/1 |
| 9,122,085 B2 * | 9/2015 | Rasras | G02F 1/0147 |
| 9,235,101 B2 | 1/2016 | Silverstone et al. | |
| 2010/0247022 A1 | 9/2010 | Li et al. | |
| 2010/0284645 A1 | 11/2010 | Doerr | |
| 2012/0087613 A1 | 4/2012 | Rasras | |
| 2016/0013609 A1 | 1/2016 | Doerr | |
| 2016/0245639 A1 | 8/2016 | Mower et al. | |
| 2016/0266414 A1 | 9/2016 | Gill et al. | |

OTHER PUBLICATIONS

Passaro, et al., "Investigation of thermo-optic effect and multi-reflector tunable filter/multiplexer in SOI waveguides," May 2, 2005, vol. 13, No. 9, Optics Express 3430.

(Continued)

*Primary Examiner* — Sung Pak
(74) *Attorney, Agent, or Firm* — Patterson + Sheridan, LLP

(57) ABSTRACT

Embodiments include a method and associated apparatuses for phase-shifting an optical signal. The method comprises receiving, at a first end of an optical waveguide formed in a semiconductor layer and extending along a first axis, an optical signal having a first phase. The method further comprises transmitting, at a second end of the optical waveguide opposite the first end, a modified optical signal having a second phase different than the first phase. Transmitting a modified optical signal comprises applying a voltage signal between a first contact region and a second contact region formed in the semiconductor layer apart from the first axis. Applying a voltage signal causes an electrical current to be conducted along a dimension of the optical waveguide. The electrical current causes resistive heating of the optical waveguide and a desired phase shift between the first phase and the second phase.

20 Claims, 5 Drawing Sheets

(56) References Cited

OTHER PUBLICATIONS

Sohma, S.; Goh, T.; Okazaki, H.; Okuno, M.; Sugita, A., "Low switching power silica-based super high delta thermo-optic switch with heat insulating grooves," Electronics Letters, vol. 38, No. 3, pp. 127,128, Jan. 31, 2002, [Available Online] http://ieeexplore.ieee.org/xpl/abstractAuthorsjsp?arnumber=984407 [Abstract Only].
Qing Fang; Jun Feng Song; Tsung-Yang Liow; Hong Cai; Ming-Bin Yu; Guo-Qiang Lo; Dim-Lee Kwong, "Ultralow Power Silicon Photonics Thermo-Optic Switch With Suspended Phase Arms," Photonics Technology Letters, IEEE , vol. 23, No. 8, pp. 525,527, Apr. 15, 2011,[Available Online] http://ieeexplore_ieee.org/xpls/abs_all.jsp?arnumber=5712163 [Abstract Only].
Peng Sun and Ronald M. Reano, "Submilliwatt thermo-optic switches using free-standing silicon-on-insulator strip waveguides," Apr. 12, 2010, vol. 18, No. 8, Optics Express 8406.
Dong et al, "Thermally tunable silicon racetrack resonators with ultralow tuning power," Sep. 13, 2010, vol. 18, No. 19, Optics Express 20298.
Malik et al., "Ge-on-Si and Ge-on-SOI thermo-optic phase shifters for the mid-infrared," Nov. 17, 2014, vol. 22, No. 23, DOI: 10.1364/OE.22.028479, Optics Express 28479.
Watts et al., "Adiabatic thermo-optic Mach-Zehnder switch," Mar. 1, 2013, vol. 28, No. 5, Optic Letters.
Harris et al., "Efficient, compact and low loss thermo-optic phase shifter in silicon," May 5, 2014, vol. 22, No. 9, DOI: 0,1364/OE.22.010487, Optics Express.
PCT Notification of Transmittal of the International Search Report and the Writtren Opinion of the International Searching Authority for Applicatiion No. PCT/US2018/026485 dated Jul. 26, 2018.

\* cited by examiner

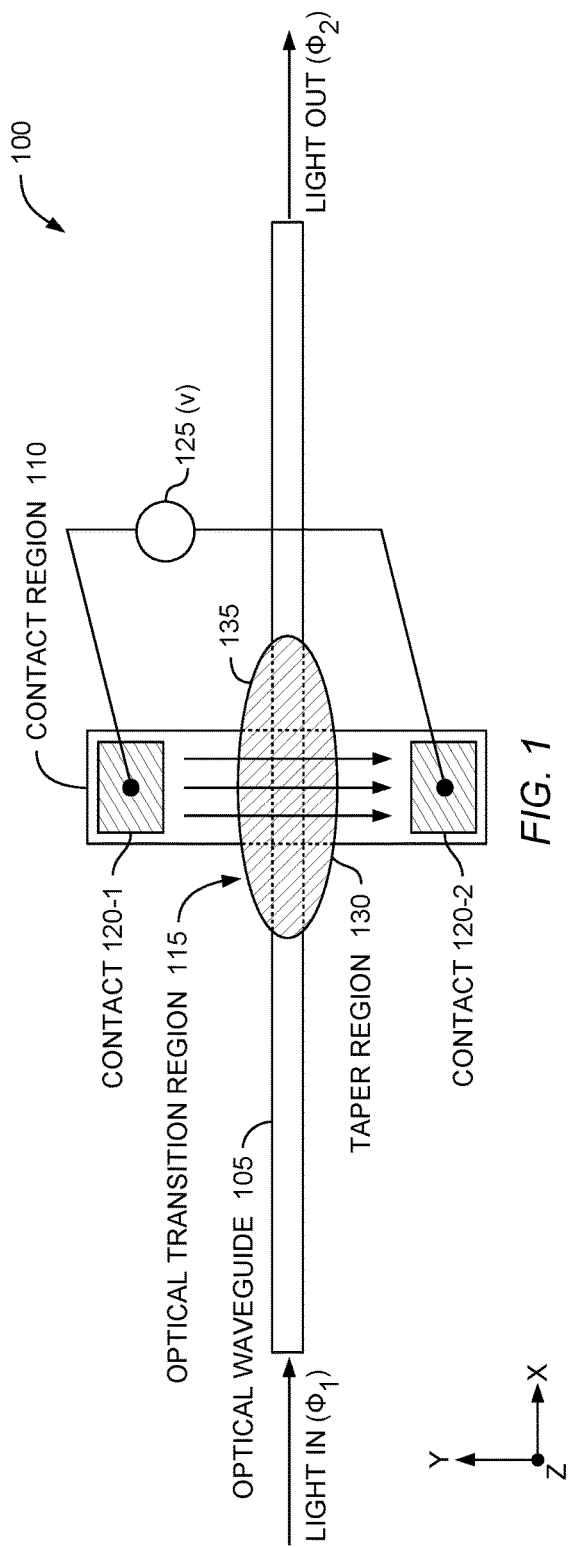
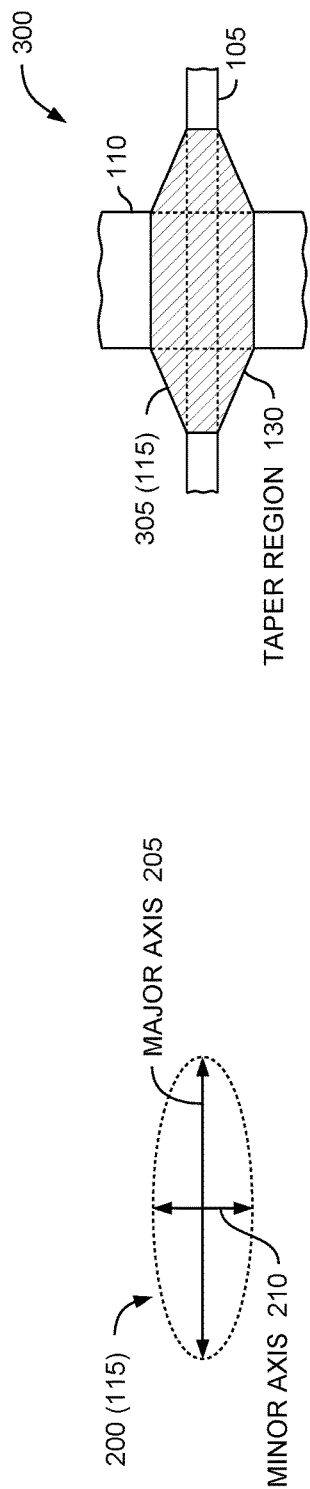
FIG. 1
FIG. 2
FIG. 3

THERMO-OPTIC PHASE SHIFTER FOR SEMICONDUCTOR OPTICAL WAVEGUIDE

TECHNICAL FIELD

Embodiments presented in this disclosure generally relate to photonics, and more specifically, a thermo-optic phase shifter formed in a same semiconductor layer as an optical waveguide.

BACKGROUND

In photonics circuitry, thermo-optic phase shifters are often used as optical bias or tuning elements, such as in modulators or in tunable filters. Generally, an improved efficiency of thermo-optic phase shifters can be desirable for producing smaller and/or low-power optical devices, as well as for providing a greater tuning range within a given power budget.

One technique for improving the efficiency of a thermo-optic phase shifter includes placement of a distinct heating element in close proximity to the optical waveguide, which reduces an amount of heat that is coupled into other nearby elements, such as a substrate. However, the close proximity of the heating element tends to increase an optical insertion loss. Another technique for improving the efficiency of the thermo-optic phase shifter includes thermally isolating the heating element and/or optical waveguide from other elements (e.g., the substrate) using air trenches or other thermally insulative material(s).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 illustrates an exemplary apparatus for conducting electrical current along a width of an optical waveguide, according to one embodiment.

FIG. 2 illustrates a major axis and a minor axis of an elliptical optical transition region, according to one embodiment.

FIG. 3 illustrates an exemplary optical transition region defining a linear taper, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 4:
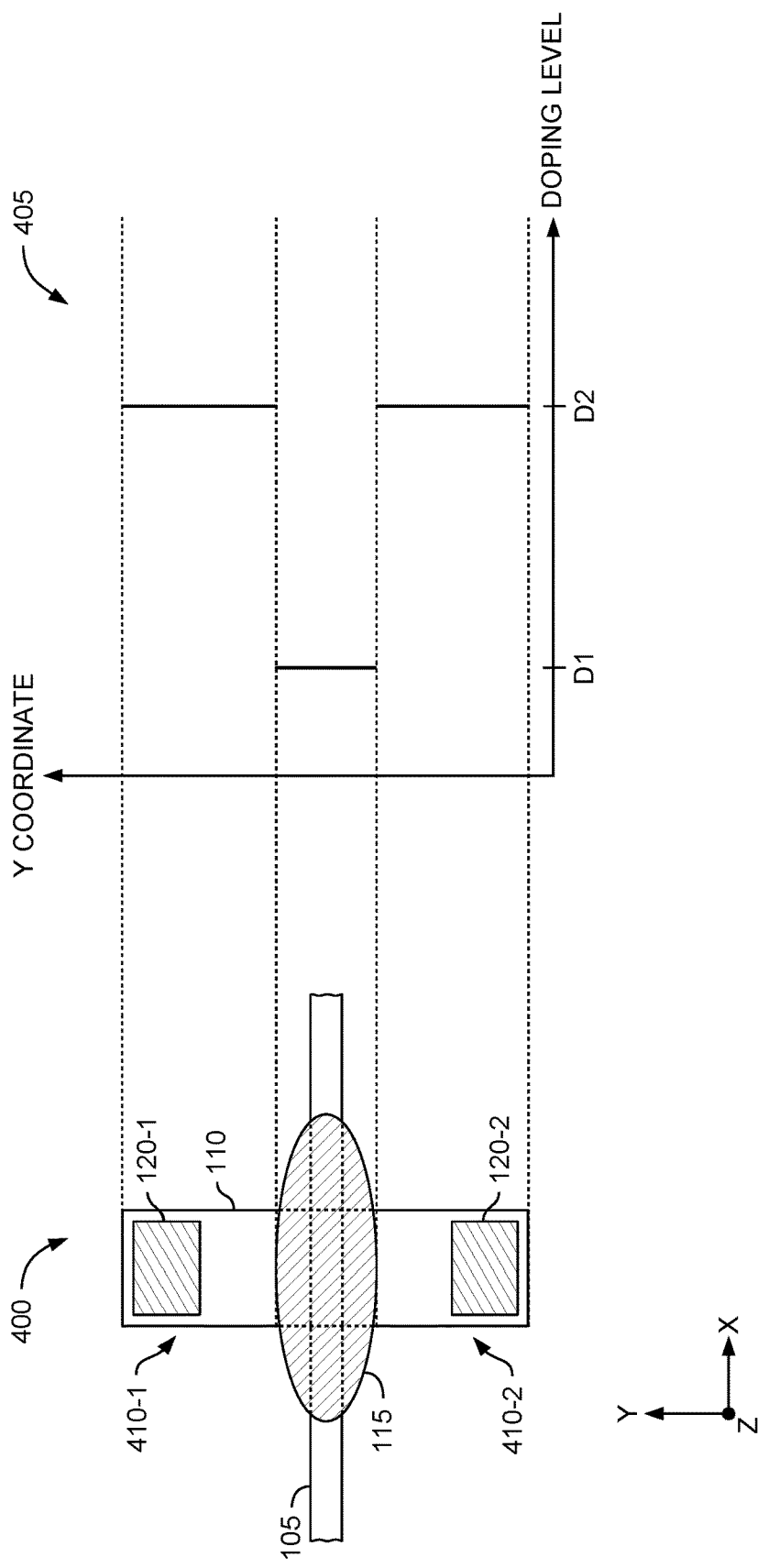
FIG. 4 illustrates an exemplary doping profile for a thermo-optic phase shifter, according to one embodiment.

One embodiment presented in this disclosure is an apparatus comprising an optical waveguide formed in a semiconductor layer, a first contact region formed in the semiconductor layer and intersecting the optical waveguide, and a first optical transition region that extends between the optical waveguide and the first contact region. The first contact region is electrically coupled with the first optical transition region and is configured to conduct electrical current along a dimension of the optical waveguide to apply resistive heating to the optical waveguide.

Another embodiment is an apparatus comprising an optical waveguide formed in a semiconductor layer and extending along a first axis, the optical waveguide having a first doping level. The apparatus further comprises a first contact region and a second contact region formed in the semiconductor layer apart from the first axis, wherein the first contact region and the second contact region each have a corresponding second doping level that is greater than the first doping level. An electrical current is conducted along a dimension of the optical waveguide responsive to a voltage signal applied between the first contact region and the second contact region, and resistive heating of the optical waveguide is provided by the electrical current.

Another embodiment is a method comprising receiving, at a first end of an optical waveguide formed in a semiconductor layer and extending along a first axis, an optical signal having a first phase. The method further comprises transmitting, at a second end of the optical waveguide opposite the first end, a modified optical signal having a second phase different than the first phase. Transmitting a modified optical signal comprises applying a voltage signal between a first contact region and a second contact region formed in the semiconductor layer apart from the first axis. Applying a voltage signal causes an electrical current to be conducted along a dimension of the optical waveguide, and the electrical current causes resistive heating of the optical waveguide and a desired phase shift between the first phase and the second phase.

EXAMPLE EMBODIMENTS

Embodiments of the disclosure are generally directed to implementations of a thermo-optic phase shifter apparatus formed in a same semiconductor layer as an optical waveguide. In some embodiments, at least a first contact region is formed in the semiconductor layer and is configured to conduct electrical current along a dimension of the optical waveguide to apply resistive heating to the optical waveguide. The dimension may be a width or a length of the optical waveguide. In this way, the optical waveguide itself may be operated as a resistive heating element, such that the apparatus need not include a separate heating element.

In some embodiments, the apparatus comprises at least a first optical transition region that extends between the optical waveguide and the first contact region. The first optical transition region has a shape and size that are selected to mitigate an optical loss that might normally occur due to the intersection of the first contact region with the optical waveguide. In some embodiments, the first optical transition region defines a linear taper between the optical waveguide and the first contact region. In other embodiments, the first optical transition region defines a curved taper between the optical waveguide and the first contact region. For example, the first optical transition region may be an ellipse that overlaps the optical waveguide, where a major axis of the ellipse is aligned with a longitudinal axis of the waveguide, and a minor axis of the ellipse is substantially perpendicular to the longitudinal axis.

In some embodiments, the first contact region has a first doping level that is greater than a second doping level of the optical waveguide. In one embodiment, the first optical transition region also has the second doping level. In this way, the optical waveguide and/or the first optical transition region may have a greater resistance than in the first contact region, so that the electrical current tends to concentrate heating at the optical mode and minimizes heat lost to other portions of the photonics platform.

FIG. 1 illustrates an exemplary apparatus 100 for conducting electrical current along a width of an optical waveguide, according to one embodiment. In some embodiments, the apparatus 100 is formed within a single semiconductor layer, such as within a silicon layer of a silicon-on-insulator (SOI)-based photonics platform comprising a plurality of optical components. Implementations using suitable alternate semiconductor material(s) are also possible.

The apparatus 100 comprises an optical waveguide 105 that extends in the semiconductor layer along a first axis. As shown, the first axis corresponds to an X-axis. The apparatus 100 further comprises a contact region 110 formed in the semiconductor layer and intersecting the optical waveguide 105. In some embodiments, the contact region 110 extends in the semiconductor layer along a second axis. In some embodiments, the second axis is substantially perpendicular to the first axis. As shown, the second axis corresponds to a Y-axis. However, in other embodiments, the contact region 110 may intersect the optical waveguide 105 at other suitable angles. In some embodiments, the contact region 110 extends to both sides (that is, in the positive Y-direction and in the negative Y-direction) of the optical waveguide 105. In other embodiments, the contact region 110 extends only to one side of the optical waveguide 105. Further, while the extent of the contact region 110 on the first side of the optical waveguide 105 is depicted as substantially the same as the extent of the contact region 110 on the second side of the optical waveguide 105, this is not a requirement.

As shown, the contact region 110 is connected with two metal contacts 120-1, 120-2, although other suitable conductive materials for the contacts 120-1, 120-2 are possible. The contact 120-1 is disposed to a first side of the optical waveguide 105 and the contact 120-2 is disposed to an opposing second side of the optical waveguide. Through the contacts 120-1, 120-2, the contact region 110 is connected with a voltage source 125 that is configured to apply a voltage signal v across the optical waveguide 105. The voltage signal v causes an electrical current 135 to pass between the contacts 120-1, 120-2 and along a dimension of the optical waveguide 105. As shown, the dimension of the optical waveguide 105 is a width of the optical waveguide 105 that is substantially aligned with the Y-axis. Due to thermo-electric properties, the electrical current 135 causes a heating of the optical waveguide 105, such that the apparatus 100 is configured to receive an optical signal ("Light in") at the optical waveguide 105 having a first phase $\phi_1$ and transmits a modified optical signal ("Light out") having a second phase $\phi_2$ different than the first phase $\phi_1$.

The apparatus 100 further comprises an optical transition region 115 that extends between the optical waveguide 105 and the contact region 110. The optical transition region 115 has a shape and size that are selected to mitigate an optical loss that might normally occur due to the intersection of the contact region 110 with the optical waveguide 105. For example, the dimensions of the optical transition region 115 may be selected based on one or more of the wavelength of the received first optical signal and the dimensions of the optical waveguide 105 (e.g., a width of the optical waveguide 105 in the Y-direction, a thickness of the semiconductor layer in the Z-direction). One or more taper regions 130 are defined by the optical transition region 115 and extend between the optical waveguide 105 and the contact region 110.

In other embodiments, the optical transition region 115 (more specifically, the taper region 130) defines a curved taper between the optical waveguide 105 and the contact region 110. For example, and as shown in FIGS. 1 and 2, the optical transition region 115 may be an ellipse 200 that overlaps the optical waveguide 105. Other shapes of the optical transition region 115 having a curved taper are also possible, such as circular, semi-circular, semi-elliptical, and so forth. In some cases, the ellipse 200 is centered over the intersection of the optical waveguide 105 and the contact region 110. In some embodiments, a major axis 205 of the ellipse 200 is aligned with the long axis of the optical waveguide 105 (as shown, along the X-axis), and a minor axis 210 of the ellipse 200 is aligned with the long axis of the contact region 110 (as shown, along the Y-axis and substantially perpendicular to the long axis of the optical waveguide 105). In one embodiment, a ratio of the major axis 205 to the minor axis 210 is approximately 4:1. For example, for a major axis 205 of 10 microns (μm), the minor axis 210 is approximately 2.5 μm. The ratio corresponds to a lowest optical loss of the apparatus 100.

In some embodiments, the optical transition region 115 (more specifically, the taper region 130) defines a linear taper between the optical waveguide 105 and the contact region 110. As shown in FIG. 3, the optical transition region 115 may be an octagon 305 that overlaps the optical waveguide 105. Other shapes of the optical transition region 115 having a linear taper are also possible, such as rectangular, diamond, hexagonal, and so forth. Further, although curved taper and linear tapers are specifically discussed herein, the taper region 130 may have any other contour suitable to reduce optical loss caused by the intersection of the optical waveguide 105 and the contact region 110.

In some embodiments, the optical waveguide 105, the contact region 110, and/or the optical transition region 115 may be monolithically formed, but this is not a requirement. For example, the optical waveguide 105, the contact region 110, and the optical transition region 115 may be etched from a single layer of silicon or other suitable semiconductor material.

In some embodiments, a heating concentration of the apparatus 100 may be controlled by dimensioning and/or doping different portions of the apparatus 100 differently. For example, a known etching process may be used to perform a partial etch of the optical transition region 115 and/or the optical waveguide 105 to provide a smaller electrical cross section and therefore a relatively greater resistance than other portion(s) of the contact region 110. In another example, a known doping process may cause the optical transition region 115 and/or the optical waveguide 105 to have a relatively lesser doping level and therefore a relatively greater resistance than the other portion(s) of the contact region 110.

FIG. 4 illustrates an exemplary doping profile 405 for a thermo-optic phase shifter, according to one embodiment. More specifically, diagram 400 illustrates a doping profile 405 relative to the long axis (as shown, aligned in a Y-dimension) of the contact region 110.

In plot 405, the optical transition region 115 and optical waveguide 105 have a first doping level D1, and the portions 410-1, 410-2 of the contact region 110 that are not overlapping from the optical transition region 115 have a second doping level D2 that is greater than doping level D1. In this way, the optical transition region 115 and the optical waveguide 105 may have a relatively greater resistance than the portions 410-1, 410-2. When electrical current flows across the contact region 110, the generated heat has a greater concentration near the optical waveguide 105 due to the relatively greater resistance.

In some embodiments, the optical transition region 115 and/or the optical waveguide 105 may be dimensioned differently than the portions 410-1, 410-2. For example, the optical transition region 115 and/or the optical waveguide 105 have a smaller electrical cross section than the portions 410-1, 410-2, which provides the optical transition region 115 and/or the optical waveguide 105 with a relatively greater resistance than the portions 410-1, 410-2. In one embodiment, the optical transition region 115 and/or the optical waveguide 105 may be partially etched to have a shorter height (e.g., in the Z-direction) than the portions 410-1, 410-2. The different dimensioning may be performed in addition to, or as an alternative to, the different doping levels discussed above.

Further, while the different doping levels and/or heights have been described as two discrete levels or heights, alternate embodiments may include more than two discrete levels or heights, and/or one or more portions having a substantially continuous transition between different levels or different heights (e.g., a gradient).

Figure 5:
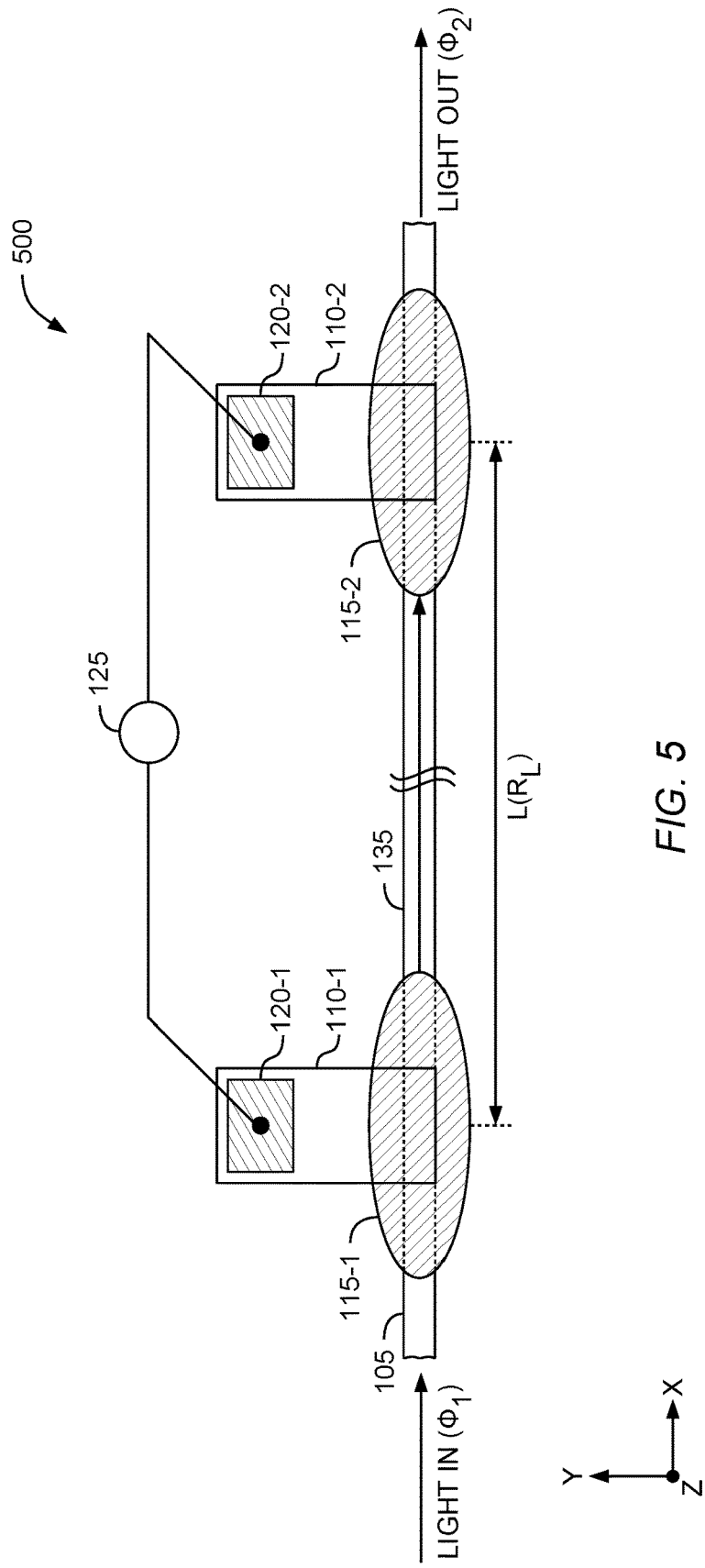
FIG. 5 illustrates an exemplary apparatus for conducting electrical current along a length of an optical waveguide, according to one embodiment.

FIG. 5 illustrates an exemplary apparatus 500 for conducting electrical current along a length of an optical waveguide, according to one embodiment. The apparatus 500 may be used in conjunction with other embodiments described herein. The apparatus 500 comprises the optical waveguide 105, a first contact region 110-1 that intersects the optical waveguide 105 at a first intersection, and a second contact region 110-2 that intersects the optical waveguide 105 at a second intersection.

The contact region 110-1 is connected with a first contact 120-1, and the second contact region 110-2 is connected with a second contact 120-2. The contact 120-1 is disposed to a first side of the optical waveguide 105 (in the positive Y-direction) and the contact 120-2 is also disposed to the first side of the optical waveguide 105. Alternatively, the contacts 120-1, 120-2 may be disposed on opposing sides of the optical waveguide 120. The contact regions 110-1, 110-2 may have substantially the same material composition, dimensioning, and/or orientation relative to the optical waveguide 105, but this is not a requirement. For example, the extent of the contact region 110-1 on the first side of the optical waveguide 105 is depicted as being substantially the same as the extent of the contact region 110-2 on the first side.

The voltage source 125 is configured to apply a voltage signal across the optical waveguide 105 though the contact regions 110-1, 110-2. The applied voltage signal causes an electrical current 135 to pass between the contacts 120-1, 120-2 and along a dimension of the optical waveguide 105. As shown, the dimension of the optical waveguide 105 is a length of the optical waveguide 105 that is substantially aligned with the X-axis. Due to thermo-electric properties, the electrical current 135 causes a heating of the optical waveguide 105, such that the apparatus 100 is configured to receive an optical signal ("Light in") at the optical waveguide 105 having a first phase $\phi_1$ and transmits a modified optical signal ("Light out") having a second phase $\phi_2$ different than the first phase $\phi_1$.

The apparatus 500 further comprises a first optical transition region 115-1 that extends between the optical waveguide 105 and the first contact region 110-1 near the first intersection, and a second optical transition region 115-2 that extends between the optical waveguide 105 and the second contact region 110-2 near the second intersection. As shown, the first optical transition region 115-1 and the second optical transition region 115-2 extend beyond the corresponding intersection, e.g., to the negative Y-direction of the optical waveguide 105.

The first optical transition region 115-1 and second optical transition region 115-2 each has a shape and size that are selected to mitigate an optical loss that might normally occur due to the intersection of the corresponding contact region 110-1, 110-2 with the optical waveguide 105. For example, the dimensions of each optical transition region 115-1, 115-2 may be selected based on one or more of the wavelength of the received first optical signal and the dimensions of the optical waveguide 105 (e.g., a width of the optical waveguide 105 in the Y-direction, a thickness of the semiconductor layer in the Z-direction). The first optical transition region 115-1 and the second optical transition region 115-2 each include one or more taper regions.

Consistent with the discussion above, the optical transition regions 115-1, 115-2, the optical waveguide 105, and/or the contact regions 110-1, 110-2 may have relative doping levels and/or dimensioning to provide relative resistance. In this way, resistive heat generated by the flow of electrical current 135 may have a greater concentration near the optical waveguide 105. A length L of the optical waveguide 105 is defined between the first intersection and the second intersection. In some embodiments, the length L is selected such that the optical waveguide 105 presents a desired resistance $R_L$ between the first contact 110-1 and the second contact 110-2.

Figure 6:
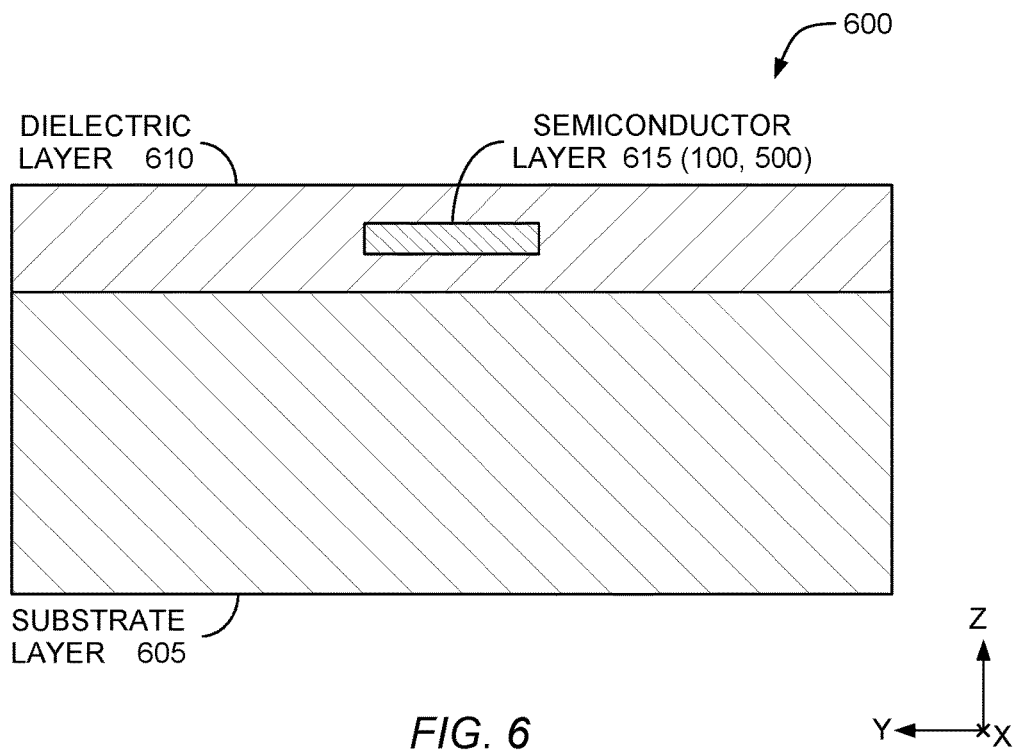
FIG. 6 illustrates a plurality of layers including a thermo-optic phase shifter in a semiconductor layer, according to one embodiment.

FIG. 6 illustrates a plurality of layers including a thermo-optic phase shifter in a semiconductor layer, according to one embodiment. For example, the photonics platform 600 depicted in FIG. 6 may be a SOI-based photonics platform. The thermo-optic phase shifter (e.g., an apparatus 100, 500) may be formed in a semiconductor layer 615 of the photonics platform, according to techniques discussed above.

In photonics platform 600, a dielectric layer 610 is partially disposed between a substrate layer 605 and the semiconductor layer 615. In an example SOI-based implementation, the semiconductor layer 615 may be formed of silicon (Si), the dielectric layer 610 may be formed of silicon dioxide ($SiO_2$), and the substrate layer 605 may be formed of silicon. As shown, the dielectric layer 610 substantially surrounds the semiconductor layer 615. However, in other embodiments, the dielectric layer 610 is disposed entirely between the substrate layer 605 and the semiconductor layer 615.

Figure 7:
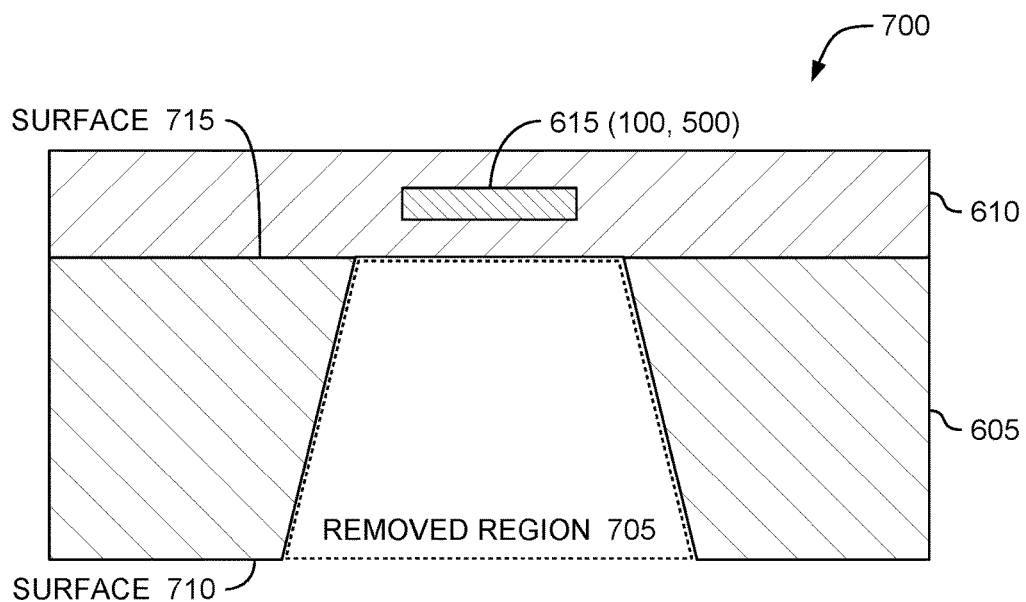
FIG. 7 illustrates a plurality of layers having a region removed from a substrate layer, according to one embodiment.

In FIG. 7, a photonics platform 700 has a removed region 705 from a substrate layer 605. The removed region 705 is generally overlapping with at least a portion of the semiconductor layer 615. In some embodiments, the removed region overlaps with at least one of an optical waveguide, a contact region, and an optical transition region formed in the semiconductor layer 615.

The material of the removed region 705 may be removed using backside etching techniques that are known in the art. In one example, a deep reactive ion etching or a wet etching may be performed from a surface 710 of the substrate layer 605. In another example, a complementary metal-oxide-semiconductor (CMOS) etching process or a microelectromechanical systems (MEMS) etching process may be performed from the surface 710. Whatever backside etching process is used, in some embodiments the removed region 705 extends from the surface 710 to an opposing surface 715 of the substrate layer 605.

Removing material from the removed region 705 minimizes a primary thermal radiation path from the thermo-optic phase shifter (in the semiconductor layer 615) to the substrate layer 605. Minimizing the thermal radiation path improves the efficiency of the thermo-optic phase shifter, which in some cases can be an improvement of up to 10 times.

Figure 8:
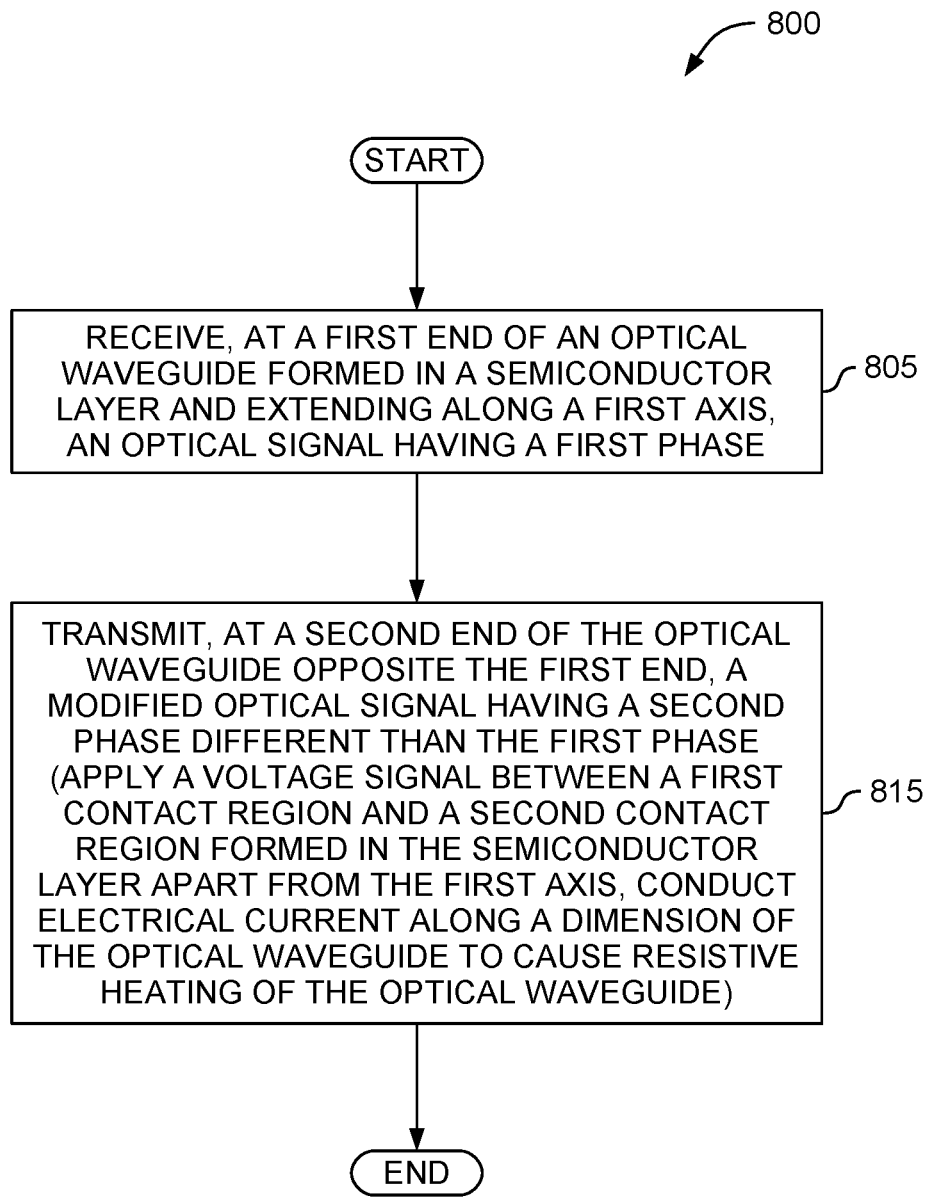
FIG. 8 illustrates an exemplary method of phase-shifting an optical signal, according to one embodiment.

FIG. 8 illustrates an exemplary method 800 of phase-shifting an optical signal, according to one embodiment. Method 800 may be used in conjunction with other embodiments disclosed herein, such as the apparatus 100 of FIG. 1 or the apparatus 500 of FIG. 5.

Method 800 begins at block 805, where an optical signal is received at a first end of an optical waveguide formed in a semiconductor layer and extending along a first axis. The first optical signal has a first phase.

At block 815, a modified optical signal is transmitted at a second end of the optical waveguide opposite the first end. The modified optical signal has a second phase different than the first phase. In some embodiments, transmitting the modified optical signal comprises applying a voltage signal between a first contact region and a second contact region that are formed in the semiconductor layer apart from the first axis. Applying the voltage signal conducts electrical current along a dimension of the optical waveguide to cause resistive heating of the optical waveguide. In some embodiments, the dimension is a width of the optical waveguide. In other embodiments, the dimension is a length of the optical waveguide. Method 800 ends following completion of block 815.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

In view of the foregoing, the scope of the present disclosure is determined by the claims that follow.

We claim:

1. An apparatus comprising:
an optical waveguide formed in a semiconductor layer;
a first contact region formed in the semiconductor layer and intersecting the optical waveguide; and
a first optical transition region that extends between the optical waveguide and the first contact region,
wherein the first contact region is electrically coupled with the first optical transition region and configured to conduct electrical current through the optical waveguide along at least a first dimension of the optical waveguide to apply resistive heating to the optical waveguide.

2. The apparatus of claim 1, wherein the optical waveguide extends in the semiconductor layer along a first axis, and
wherein the first contact region extends in the semiconductor layer along a second axis that is substantially perpendicular to the first axis.

3. The apparatus of claim 2, wherein the first optical transition region defines a linear taper between the optical waveguide and the first contact region.

4. The apparatus of claim 2, wherein the first optical transition region defines a curved taper between the optical waveguide and the first contact region.

5. The apparatus of claim 4, wherein the first optical transition region comprises a first ellipse overlapping the optical waveguide, wherein the first ellipse has a major axis aligned with the first axis, and a minor axis aligned with the second axis.

6. The apparatus of claim 5, wherein a ratio of the major axis to the minor axis is approximately 4:1.

7. The apparatus of claim 1, wherein the first contact region has a first doping level that is greater than a second doping level of the optical waveguide.

8. The apparatus of claim 7, wherein the first contact region is coupled with a first metal contact.

9. The apparatus of claim 1, wherein electrical current is conducted across a width of the optical waveguide.

10. The apparatus of claim 1, further comprising:
a second contact region formed in the semiconductor layer and intersecting the optical waveguide; and
a second optical transition region that extends between the optical waveguide and the second contact region,
wherein applying a voltage signal between the first contact region and the second contact region causes an electrical current to be conducted along a length of the optical waveguide.

11. The apparatus of claim 10, wherein the length of the optical waveguide is selected to provide a desired resistance for the resistive heating.

12. The apparatus of claim 1, further comprising:
a substrate layer; and
a dielectric layer having at least partially disposed between the semiconductor layer and the substrate,
wherein the substrate layer defines a removed region that overlaps with at least one of the optical waveguide, the first contact region, and the first optical transition region.

13. An apparatus comprising:
an optical waveguide formed in a semiconductor layer and extending along a first axis, the optical waveguide having a first doping level; and
a first contact region and a second contact region formed in the semiconductor layer apart from the first axis, wherein the first contact region and the second contact region each have a corresponding second doping level that is greater than the first doping level,
wherein an electrical current is conducted through the optical waveguide along at least a first dimension of the optical waveguide responsive to a voltage signal applied between the first contact region and the second contact region, and
wherein resistive heating of the optical waveguide is provided by the electrical current.

14. The apparatus of claim 13, wherein the optical waveguide defines a first optical transition region extending away from the first axis, and wherein the first contact region is electrically coupled with the first optical transition region.

15. The apparatus of claim 14, wherein the second contact region is electrically coupled with the first optical transition region.

16. The apparatus of claim 13, wherein each of the first contact region and the second contact region extends along a respective second axis that is substantially perpendicular to the first axis.

17. A method comprising:

receiving, at a first end of an optical waveguide formed in a semiconductor layer and extending along a first axis, an optical signal having a first phase; and transmitting, at a second end of the optical waveguide opposite the first end, a modified optical signal having a second phase different than the first phase, wherein transmitting a modified optical signal comprises:

applying a voltage signal between a first contact region and a second contact region formed in the semiconductor layer apart from the first axis, wherein applying a voltage signal causes an electrical current to be conducted through the optical waveguide along at least a first dimension of the optical waveguide, wherein the electrical current causes resistive heating of the optical waveguide and a desired phase shift between the first phase and the second phase.

18. The method of claim 17, wherein the optical waveguide defines a first optical transition region extending away from the first axis, and wherein the first contact region is electrically coupled with the first optical transition region.

19. The method of claim 18, wherein the second contact region is electrically coupled with the first optical transition region.

20. The method of claim 17, wherein each of the first contact region and the second contact region extends along a respective second axis that is substantially perpendicular to the first axis.

\* \* \* \* \*